United States Patent
Chiocco et al.

(10) Patent No.: US 9,661,809 B2
(45) Date of Patent: May 30, 2017

(54) DYNAMIC APPLICATION SYSTEM PRIMING

(75) Inventors: Gregory Daniel Chiocco, Sunnyvale, CA (US); Gurcan Aral, Cupertino, CA (US)

(73) Assignee: Trimble Navigation Limited, Sunnyvale, CA (US)

( * ) Notice: Subject to any disclaimer, the term of this patent is extended or adjusted under 35 U.S.C. 154(b) by 1189 days.

(21) Appl. No.: 13/607,406

(22) Filed: Sep. 7, 2012

(65) Prior Publication Data
US 2014/0070019 A1    Mar. 13, 2014

(51) Int. Cl.
| | | |
|---|---|---|
| B05B 17/04 | (2006.01) |
| A01G 25/16 | (2006.01) |
| A01C 21/00 | (2006.01) |
| A01M 7/00 | (2006.01) |
| A01C 23/00 | (2006.01) |

(52) U.S. Cl.
CPC ............ *A01G 25/16* (2013.01); *A01C 21/005* (2013.01); *A01C 23/007* (2013.01); *A01M 7/0089* (2013.01)

(58) Field of Classification Search
CPC .... A01G 25/16; A01C 21/005; A01C 23/007; A01M 7/0089
USPC ................................... 239/11, 723
See application file for complete search history.

(56) References Cited

U.S. PATENT DOCUMENTS

| | | | |
|---|---|---|---|
| 5,296,702 A | 3/1994 | Beck et al. | |
| 5,348,226 A | 9/1994 | Heiniger et al. | |
| 5,389,781 A | 2/1995 | Beck et al. | |
| 5,585,626 A | 12/1996 | Beck et al. | |
| 5,704,546 A * | 1/1998 | Henderson | ............. B05B 12/00 239/1 |
| 5,763,873 A | 6/1998 | Beck et al. | |
| 5,789,741 A | 8/1998 | Kinter et al. | |
| 5,809,440 A | 9/1998 | Beck et al. | |
| 5,837,997 A | 11/1998 | Beck et al. | |
| 5,919,242 A | 7/1999 | Greatline et al. | |
| 6,122,581 A * | 9/2000 | McQuinn | ............. A01B 79/005 701/468 |

(Continued)

FOREIGN PATENT DOCUMENTS

| | | |
|---|---|---|
| GB | 2347368 A | 9/2000 |
| WO | 2012115563 A1 | 8/2012 |
| WO | WO2014039666 A2 | 3/2014 |

OTHER PUBLICATIONS

International Preliminary Report on Patentability issued in PCT/US2013/058241, completed Mar. 10, 2015.

(Continued)

*Primary Examiner* — Arthur O Hall
*Assistant Examiner* — Joel Zhou
(74) *Attorney, Agent, or Firm* — Lathrop & Gage LLP

(57) ABSTRACT

In embodiments, an application vehicle includes an application system for applying a product during an agricultural application. The application system (used in conjunction with the application vehicle) includes a priming module that determines a priming location. When the application vehicle is in proximity to the priming location, the priming module primes aspects of the application system so that it is ready to apply the product when the application vehicle reaches a region in which the product is to be applied.

15 Claims, 3 Drawing Sheets

(56) References Cited

U.S. PATENT DOCUMENTS

| | | | | |
|---|---|---|---|---|
| 6,285,938 B1* | 9/2001 | Lang | ................... | A01C 7/102 |
| | | | | 111/174 |
| 6,834,223 B2 | 12/2004 | Strelioff et al. | | |
| 2006/0025927 A1 | 2/2006 | Hoskinson et al. | | |
| 2006/0118653 A1 | 6/2006 | Shivak | | |
| 2006/0118654 A1 | 6/2006 | Shivak | | |
| 2006/0265106 A1* | 11/2006 | Giles | ................... | A01B 79/005 |
| | | | | 700/283 |
| 2009/0099737 A1* | 4/2009 | Wendte | ............... | A01B 79/005 |
| | | | | 701/50 |
| 2012/0168528 A1* | 7/2012 | Hillger | ............... | A01M 7/0089 |
| | | | | 239/11 |
| 2012/0296529 A1* | 11/2012 | Peake | ................ | A01B 69/008 |
| | | | | 701/50 |

OTHER PUBLICATIONS

Notification of Transmittal of the International Search Report and the Written Opinion of the International Searching Authority, or the Declaration. International Application No. PCT/US2013/058241. International Filing Date: Sep. 5, 2013. Mail Date: Jun. 18, 2014.

* cited by examiner

DYNAMIC APPLICATION SYSTEM PRIMING

BACKGROUND

In the agricultural industry, sprayers and spreaders are used to apply chemical products and granulated products, respectively, such as pesticides, herbicides, and fertilizers. Typically, a sprayer or spreader includes an application vehicle such as a tractor or other device that suspends and carries an adjustably attached boom over a ground surface as the products are applied using an application system (i.e., the mechanism for applying the chemical or granulated products onto the ground and/or vegetation). Application systems can include latency characteristics such as, for example, communication delays in the control system, time delays associated with building pressure, time delays associated with opening and closing valves or chutes, time delays associated with activating and deactivating pumps, and the like. Latency characteristics such as these can, for example, result in application of a product beginning after the application vehicle has entered a region in which the product is to be applied and in application of a product continuing after the application vehicle has exited the region.

SUMMARY

To mitigate potential effects of latency characteristics, embodiments include a priming module that determines a priming location based on available information such as, for example, application system latency characteristics, a position of the application vehicle, the motion of the application vehicle, a map, and the like. The priming location is a location at which the application system is to be primed such that, when the application vehicle reaches the region in which the product is to be applied, the application system is ready to deliver the product. In embodiments, priming the application system can include communicating an activation command to the application system to facilitate opening one or more valves, activating one or more pumps, opening one or more chutes, and the like.

Figure 1:
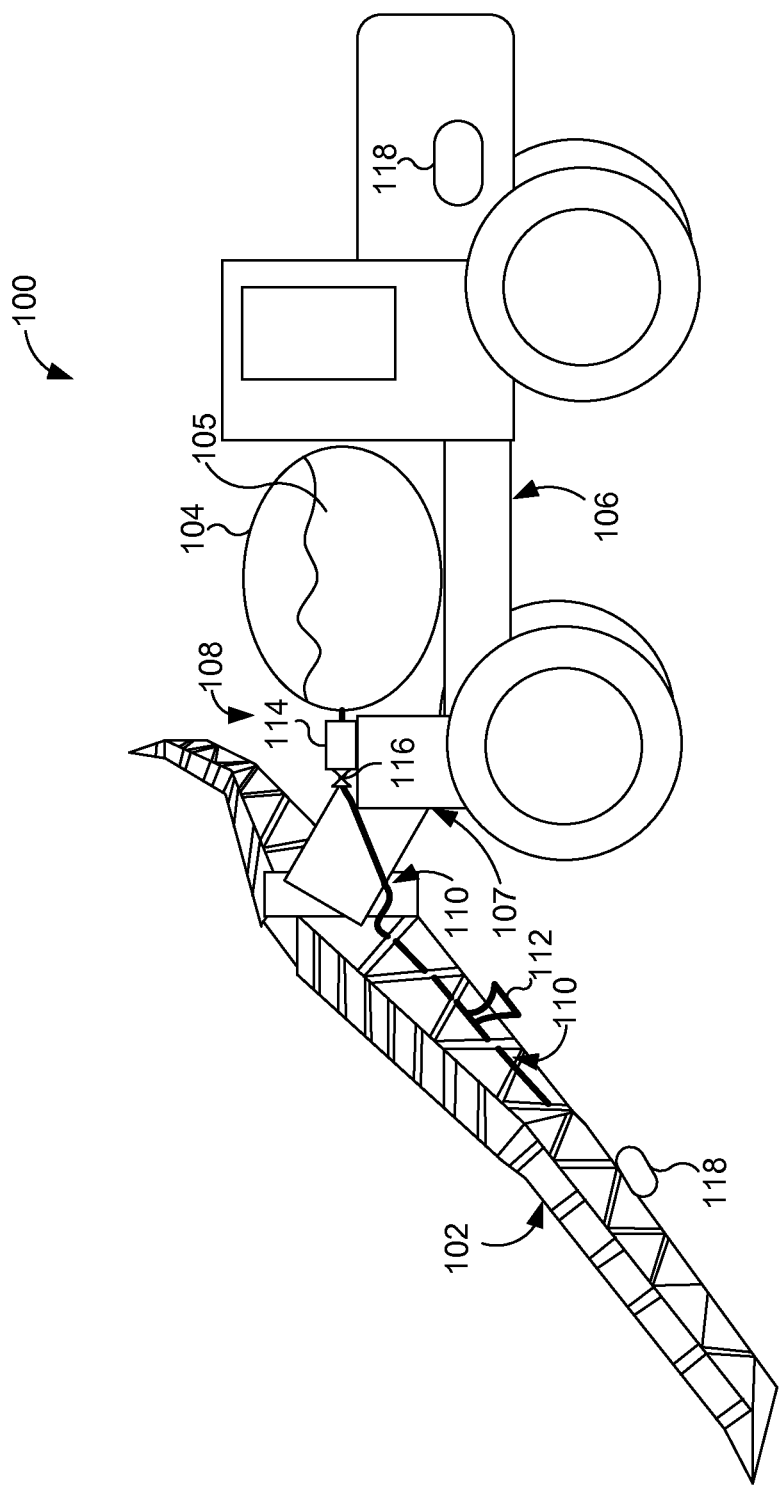
FIG. 1 illustrates an application vehicle with a boom in accordance with embodiments of the invention.

While the invention is amenable to various modifications and alternative forms, specific embodiments have been shown by way of example in the drawings and/or are described in detail below. The intention, however, is not to limit the invention to the particular embodiments shown and/or described. On the contrary, the invention is intended to cover all modifications, equivalents, and alternatives falling within the scope of the invention as defined by the appended claims.

DETAILED DESCRIPTION

FIG. 1 depicts a sprayer or a spreader 100. In embodiments, this includes an application vehicle 100 (which can be a tractor) and an attached boom 102 to which one or more tools can be mounted for performing any number of various agricultural tasks (e.g., applying chemical or granulated products onto the ground and/or vegetation). In embodiments, the application vehicle 100 can include a product tank 104 that holds a product 105 (e.g., fertilizer, pesticide, or the like). The boom 102 is moveably coupled to a chassis 106 of the application vehicle 100 via a boom mount 107. Although the illustrative application vehicle 100 of FIG. 1 is depicted as a tractor carrying the boom 102, it should be appreciated by individuals having skill in the relevant arts that the application vehicle 100 can, in fact, be any number of other types of vehicles, such as a truck or a towed vehicle (e.g., a trailer) to which a boom 102, a tool-bar, or other structure or mechanism to which agricultural tools can be attached. According to embodiments, the application vehicle 100 can include an application system 108 that includes hardware used for spraying (or spreading) nutrients, pesticides, and the like. The application system 108 can also include plumbing 110 that is adapted for transporting a product 105 (e.g., liquid, powder, etc.) from the product tank 104 to an application tool 112 such as, for example, a spray nozzle or a chute. According to embodiments, the application system 108 can additionally include other components such as pumps 114 and valves 116 and/or additional components not illustrated such as, for example, solenoids, actuators, chute doors, and the like.

As is further illustrated in FIG. 1, the application vehicle 100 can include a number of sensors 118. The sensors 118 can be any type of sensors known in the art and can be used for detecting, e.g., the height of the boom 102 with respect to the ground or some other object below the boom 102 (e.g., crops, weeds, rocks, and etc.), the position of the application vehicle 100, the speed of the application vehicle 100, the direction of travel of the application vehicle 100, the acceleration of the application vehicle 100, changes in elevation ahead of the application vehicle 100, the presence of foliage on the ground, and the like.

More specifically, in embodiments, the sensors 118 can include a number of different types of sensors such as, for example, GPS antennas; proximity sensors, which can include downward-looking sensors (e.g., sensors that measure a distance between the sensor and a ground surface substantially beneath the sensor) and forward-looking sensors (e.g., sensors that obtain measurements related to distances, the presence of obstacles, and the like, ahead of the application vehicle or at an angle with respect to the vertical such as distance measurement lasers); a vertical plane spinning light detection and ranging (LIDAR) sensor that maps heights below and ahead of the boom 102; inertial measuring units (IMUs) that can be mounted to the boom 102 or to any other part of the application vehicle 100; color-detection sensors; and the like. Additionally, the sensors 118 can include sensors for determining a motion of the application vehicle 100. For example, motion sensors 118 can be employed that determine the speed, direction, steering angle, curvature, and/or acceleration of the application vehicle 100 and, in addition to sensors listed above (e.g., IMUs), can include sensors that monitor axle rotation, transmission rotation, wheel rotation, and the like.

Figure 2:
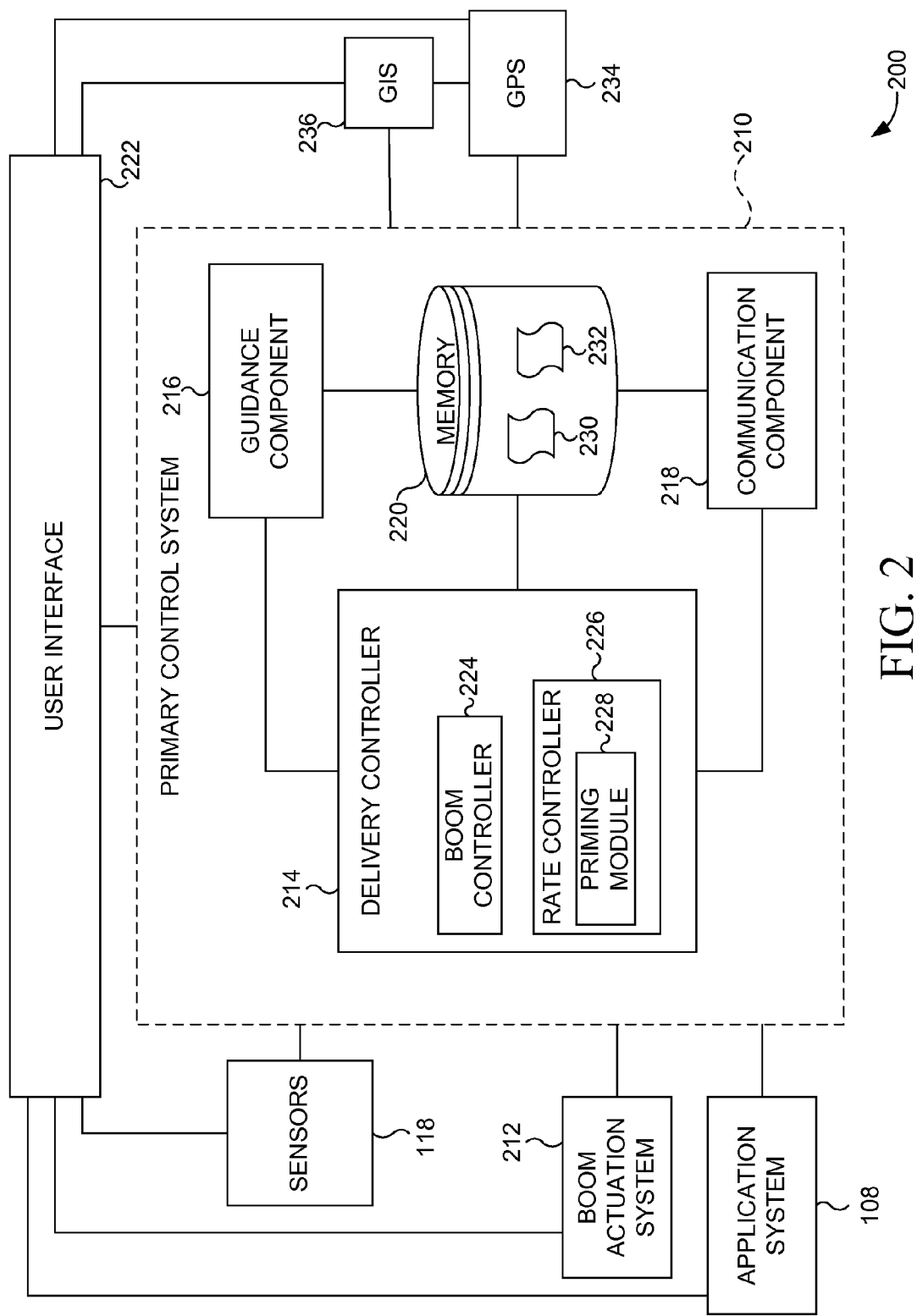
FIG. 2 is a schematic block diagram illustrating an operating environment in accordance with embodiments of the invention.

As mentioned in the Background, sprayers and spreaders can take time to prepare themselves to apply the pertinent product (e.g., by building pressure, opening valves, opening chutes, and the like), and thus an application vehicle will often have already moved past a portion of the target region before the sprayer/spreader can begin applying the product. By implementing embodiments of the invention, this issue can be avoided by priming the application system while approaching a region in which the product is to be applied. As illustrated in FIG. 2 (described below), a priming module 228 can be integrated within an application vehicle operating environment 200 and can communicate with other components of the operating environment 200 to facilitate dynamic application system priming.

Embodiments of the disclosed subject matter are described in the general context of computer-executable instructions. Computer-executable instructions can include, for example, computer code, machine-useable instructions, and the like such as, for example, program components, capable of being executed by one or more processors associated with a computing device. Exemplary program components include a delivery controller 214, a boom controller 224, a rate controller 226, and a priming module 228, as depicted in FIG. 2. Generally, program components including routines, programs, objects, modules, data structures, portions of one or more of the preceding, and the like, refer to code that, when executed, causes a computing device to perform particular tasks (e.g., methods, calculations, etc.) or implement or manipulate various abstract data types. Some or all of the functionality contemplated herein can also be implemented in hardware and/or firmware.

FIG. 2 depicts an illustrative operating environment 200 associated with an application vehicle such as, for example, the illustrative application vehicle 100 depicted in FIG. 1. The operating environment 200 includes a primary control system 210 that can be used to control the motion of the application vehicle 100, to control operation of a boom actuation system 212, and to control operation of the application system 108. The primary control system 210 includes a delivery controller 214 that, in embodiments, is what specifically controls the operation of the boom actuation system 212 and application system 108.

As is further depicted in FIG. 2, the primary control system 210 also includes a guidance component 216 and a communication component 218. According to embodiments, the guidance component 216 can be used to control aspects of the motion of the application vehicle 100 and can facilitate features such as, for example, assisted steering, automated steering, implement steering, and the like. The communication component 218 can facilitate communication between any one or more of the components of the primary control system 210 and/or other components or other devices. For instance, in embodiments, the communication component 218 provides a communication interface between the primary control system 210 and a handheld device (not shown), a computing device (not shown) located in a farm office or another vehicle, or the like. A memory component 220 can be accessible to one or more of the components of the operating environment 200 and can be used to store any number of different types of information such as, for example, GPS data, motion data, operating paths, weather information, maps, computer-executable instructions, and the like. As is also shown in FIG. 2, the operating environment can include one or more user interfaces 222 that facilitate receiving input from, and providing information to, a user.

As shown in FIG. 2, and indicated above, the delivery controller 214 can include a boom controller 224 and a rate controller 226. The boom controller 224 communicates with the boom actuation system 212 to cause adjustment of the boom. The rate controller 226 communicates with the application system 108 to control delivery of a product (e.g., the rate at which a product is delivered, activation and deactivation of the application system 108, and the like).

According to embodiments, as the application vehicle 100 moves through a field, the priming module 228 can reference a map 230 to determine that the application vehicle 100 is approaching a region in which a product is to be applied. In embodiments, the priming module 228 determines a priming location based on information such as, for example, a motion of the application vehicle 100 (e.g., speed, direction, acceleration, etc.), a position of the application vehicle 100, the map 230, an operating path 232, and the like. As used herein, the term "based on" is not meant to be restrictive, but rather indicates that a determination, prediction, calculation, or the like, is performed by using, at least, the term following "based on" as an input. For example, a priming module 228 that determines a priming location based on a map 230 may also base the determination on other factors such as, for example, a motion, a position, or the like.

When the application vehicle is in proximity to the priming location (e.g., at the priming location or within a few feet of the priming location), the rate controller 226 primes the application system 108. In embodiments, the rate controller 226 can prime the application system 108 by communicating an activation command to it. According to embodiments, priming the application system 108 can include, for example, facilitating activating one or more pumps 114, opening one or more valves 116, opening one or more chutes, and the like.

In conventional application vehicles, the application system 108 often is deactivated upon reaching the end of a region in which the product is to be applied, which can result in a small amount of product being wasted as the application system 108 is deactivated (e.g., as valves are closed, plumbing lines are cleared, chutes are closed, and the like). According to embodiments, the priming module 228 can determine a deactivating location and the rate controller 226 can deactivate the application system 108 when the application vehicle 100 is in proximity to the deactivating location (e.g., at the deactivating location or within a few feet of the deactivating location). In embodiments, the rate controller 226 deactivates the application system 108 by communicating a deactivation command to the application system 108. The deactivating location is a location at which the application system 108 is to be deactivated such that delivery of the product 105 ceases at or near the stop location. In embodiments, the priming module 228 determines the deactivating location based on information such as the motion of the application vehicle 100, the position of the application vehicle 100, a stop location corresponding to a point or boundary of the region in which the product 105 is being applied, and the like.

According to embodiments, the motion of the application vehicle 100 can be obtained, for example, from motion sensors 118. The priming module 228 can determine the application vehicle's position by referencing GPS data from a GPS component 234 located in or on the application vehicle 100. In embodiments, the GPS component 234 can also determine motion and include application information that indicates regions in which a product is to be applied, boundaries of those regions, and the like. The GPS component 234 can be any component of any type of GPS or other Global Navigation Satellite System (GNSS) and, in embodiments, is communicatively coupled to, or is integrated with, a geographic information system (GIS) 236. For example, in embodiments, the GPS component 234 can include one or more GPS antennae, one or more processors, memory, communications modules, a user interface, and the like.

In embodiments, the GPS component 234 and/or the GIS 236 can be used to create maps 230 and other digital representations of geographic information that can be stored in the memory component 220. As the term is used herein, a map 230 refers to any type of data structure containing information associated with a geographic region. Examples of the map 230 include topographic maps, listings of geographic coordinates, application maps, etc. In embodiments, a visual representation of the map 230 can be presented to a user via the user interface (UI) 222, which may also be used to manipulate the visual representation of the map 230 or even the map data, itself.

In embodiments, the map 230 may include an application map that includes information associated with applications of products to particular geographic regions. For example, in embodiments, the map 230 includes indications of regions in which a particular product is to be applied, boundaries of those regions, and the like. In embodiments, once the product has been applied to a particular region, the map 230 can be updated to indicate that the product has been applied to that region. In embodiments, the map 230 can be updated automatically as the product is being applied to the region. As an application vehicle 100 moves through a field, from region to region, the rate controller 226 can reference the map 230 to determine whether to apply a product in a particular region and, in embodiments, to determine what product to apply to the particular region. In embodiments, the map 230 can also include detailed information about a region to which product is to be applied. Using this information, the rate controller 226 can determine how much product is to be applied to the region. As indicated above, the map 230 can be generated by the GPS component 234 and/or the GIS 236. In embodiments, the map 230, or aspects thereof, can also be generated by other components, software, third parties, or the like.

In embodiments, the priming module 228 may also reference an operating path 232. Often, a particular type of product application or other task will be performed along a predetermined path through a field (e.g., an operating path 232). For example, operating paths 232 can be used to program automatic steering operations, rate control operations, and the like. In embodiments, the operating path 232 can include, for example, geographic coordinates defining a particular path that the application vehicle 100 will (or may) traverse as it performs a particular task, indications of regions in which products are to be applied (and, similarly, regions in which products have already been applied), and the like. The operating path 232 can be accessed from the memory component 220 by any number of different components of the operating environment 200. In embodiments, the memory component 220 can include a number of different operating paths 232.

In embodiments, the memory component 220 can include computer-readable media. Computer-readable media include both volatile and non-volatile media, removable and nonremovable media, and contemplate media readable by a database, a processor, a router, and various other networked devices. By way of example, and not limitation, computer-readable media can include media implemented in any method or technology for storing information. Examples of stored information include computer-executable instructions, data structures, program modules, and other data representations. Media examples include, but are not limited to, Random Access Memory (RAM); Read Only Memory (ROM); Electronically Erasable Programmable Read Only Memory (EEPROM); flash memory or other memory technologies; Compact Disc Read-Only Memory (CD-ROM), digital versatile disks (DVDs) or other optical or holographic media; magnetic cassettes, magnetic tape, magnetic disk storage or other magnetic storage devices; data transmissions; or any other medium that can be used to encode information and can be accessed by a computing device such as, for example, quantum state memory, and the like.

According to embodiments, various components of the operating environment 200 can be implemented on one or more computing devices (not shown) that are communicatively coupled to the application system 108. According to embodiments, a computing device can include any type of computing device suitable for implementing embodiments of the invention. Examples of computing devices include "workstations," "servers," "laptops," "desktops," "tablet computers," "hand-held devices," and the like, all of which are contemplated within the scope of FIG. 2 and reference to various components of the operating environment 200. In embodiments, components of the operating environment 200 can include more than one computing device such as, for example, in a distributing computing environment, a networked environment, and the like. For example, in embodiments, portions of the components of the primary control system 210 can be hosted on a computing device on the application vehicle 100, while other portions can be hosted on a handheld device, laptop, or other computing device. In other embodiments, all of the components of the operating environment 200 can be hosted by one or more computing devices on the application vehicle 100.

In embodiments, a computing device includes a bus that, directly and/or indirectly, couples the following devices: a processor, a memory, an input/output (I/O) port, an I/O component, and a power supply. Any number of additional components, different components, and/or combinations of components can also be included in the computing device. The bus represents what may be one or more busses (such as, for example, an address bus, data bus, or combination thereof). Similarly, in embodiments, the computing device can include a number of processors, a number of memory components, a number of I/O ports, a number of I/O components, and/or a number of power supplies. According to embodiments, the processor (or processors) reads data from various entities such as the memory component 220, the user interface 222, the sensors 118, and the like. For example, in embodiments, the processor executes computer-executable instructions that are stored in the memory component 220 to cause the computing device to execute program modules utilized by (or, in embodiments, represented by) the delivery controller 214, guidance component 216, and/or communication component 218.

The illustrative operating environment 200 shown in FIG. 2 is not intended to suggest any limitation as to the scope of use or functionality of embodiments of the invention disclosed throughout this document. Neither should the illustrative operating environment 200 be interpreted as having any dependency or requirement related to any single component or combination of components illustrated therein. For example, in embodiments, the illustrative operating environment 200 can include additional components such as, for example, an interface module (not illustrated) that includes circuitry to interface boom-mounted sensors 118 with the user interface 222 such as by providing an interface between serial connections and controller area network (CAN) connections. Additionally, any one or more of the components depicted in FIG. 2 can be, in embodiments, integrated with various ones of the other components depicted therein (and/or components not illustrated). Any number of other components or combinations of components can be integrated with the illustrative operating environment 200 depicted in FIG. 2, all of which are considered to be within the scope of this disclosure.

Figure 3:
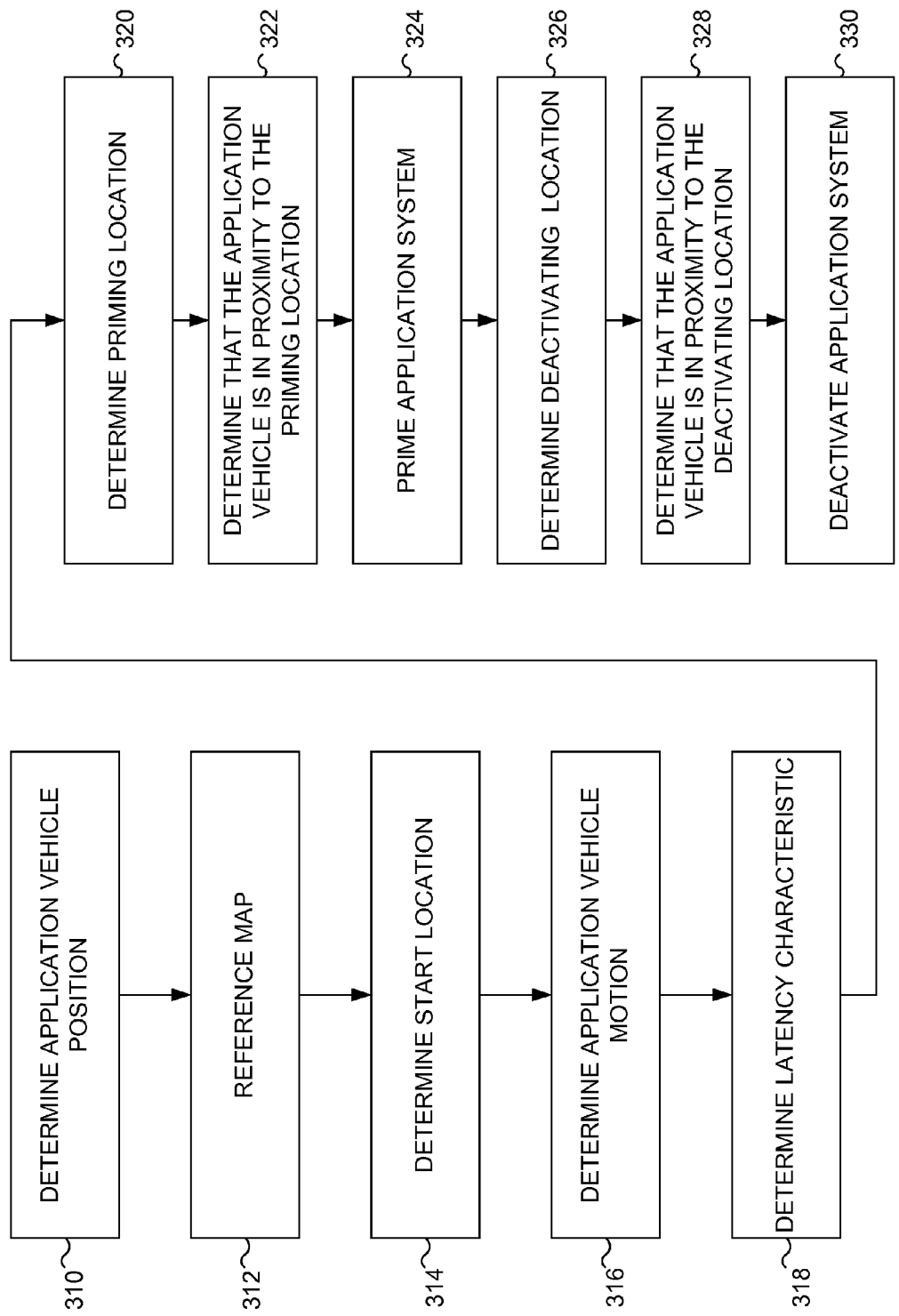
FIG. 3 is a flow diagram illustrating a method for preparing an application system in accordance with embodiments of the invention.

FIG. 3 is a flow chart depicting an illustrative method 300 of preparing an application system 108 coupled to an application vehicle 100. Embodiments of the method 300 include determining a position of the application vehicle 100 (block 310). In embodiments, the specific position to be determined may instead be (or include) that of portions of the boom (e.g., the boom 102 in FIG. 1, or portions thereof), one or more nozzles (e.g., nozzle 112 in FIG. 1), or the like. According to embodiments, the position to be determined can include (or be) a position relating to the spray trajectory of a nozzle 112 or chute. That is, for example, a nozzle 112 may be configured to spray product within a certain radius and the position that is determined can include determining a position of a leading edge of the spray radius.

According to embodiments of the method 300, a priming module 228 references a map 230 (block 312), which indicates a point and/or a boundary of a region in which a product is to be applied. The priming module 228 determines a start location (block 314) that corresponds to the point and/or boundary. Embodiments of the method 300 further include determining a motion of the application vehicle 100 (block 316) and determining a latency characteristic associated with the application system 108 (block 318). In embodiments, the latency characteristic may include an amount of time associated with communicating commands, building pressure, opening one or more valves, opening one or more chutes, or the like. In embodiments, latency characteristics may be determined using sensors 118, retrieved from memory, inputted by a user or other component, or the like.

Embodiments of the method 300 include determining a priming location (block 320), which may be based on information such as, for example, the application vehicle position, the start location, the application vehicle motion, the latency characteristic, an operating path 232, and the like. In embodiments, as the application vehicle 100 continues to operate, the priming module 228 can adjust the priming location as the information on which it is based changes. In embodiments, the priming module 228 determines that the application vehicle 100 has reached (e.g., is in proximity to) the priming location (block 322) and a rate controller 226 primes the application system 108 (block 324). The priming module 228 may also determine a deactivating location (block 326) and determine that the application vehicle 100 has reached (e.g., is in proximity to) the deactivating location (block 328), at which time the rate controller 226 can deactivate the application system 108 (block 330).

Various modifications and additions can be made to embodiments discussed herein without departing from the scope of the present disclosure. For example, while embodiments described above refer to particular features, the scope of this disclosure also includes embodiments having different combinations of features and embodiments that do not include all of the described features. Any number of other various types of embodiments may be contemplated within the ambit of this disclosure. Accordingly, the scope of the present disclosure is intended to embrace all such alternatives, modifications, and variations as fall within the scope of the claims, together with all equivalents thereof. Moreover, although the term "block" may be used herein to connote different elements of methods or algorithms employed, the term should not be interpreted as implying any particular order among or between various steps herein disclosed unless the order of individual steps is explicitly called for.

The following is claimed:

1. A system for priming an application system to apply a product onto a region of ground in conjunction with an application vehicle, the system comprising:
   a global positioning system that determines a position of the application vehicle;
   a motion determiner that determines at least a speed and a direction of the application vehicle;
   a priming module that determines a first priming location based on the position of the application vehicle the speed of the application vehicle, the direction of the application vehicle, a start location corresponding to a first point in the region in which the product is to be applied, and a first latency characteristic associated with the application system, wherein the first latency characteristic comprises an amount of time delay associated with a communication of an activation command; and wherein the first priming location is determined such that the application system is primed to begin delivering the product at the start location, the start location being separate and distinct from the first priming location; and
   a rate controller that primes the application system by communicating an activation command to the application system to control delivery of a product when the application vehicle is at the first priming location.

2. The system of claim 1, wherein the motion determiner further determines at least one of a steering angle, curvature, elevation, and acceleration of the application vehicle.

3. The system of claim 1, wherein the motion determiner comprises an inertial measuring unit (IMU).

4. The system of claim 1, wherein the motion determiner is the global positioning system.

5. The system of claim 1, further comprising a memory component having a map of the region stored therein, the map indicating an area of the region in which product is to be applied, wherein the priming module determines a second priming location based on the position of the application vehicle, the speed of the application vehicle, the direction of the application vehicle, a second latency characteristic associated with the application system, wherein the second latency characteristic comprises an amount of time delay associated with a communication of a deactivation command, and a stop location, the stop location being a second point in the region, in which the rate controller communicating a deactivation command to the application system to control delivery of the product, so the product is not to be applied, the stop location being distinct from the first and second priming locations.

6. The system of claim 5, wherein the first latency characteristic associated with the application system is stored in the memory component.

7. The system of claim 1, wherein the first latency characteristic associated with the application system further includes at least one of an amount of time delay associated with building pressure, an amount of time delay associated with opening a valve, and an amount of time delay associated with opening a chute and the second latency characteristic associated with the application system further includes at least one of an amount of time delay associated with releasing pressure, an amount of time delay associated with closing a valve, and an amount of time delay associated with closing a chute.

8. The system of claim 1, wherein the priming module primes the application system by communicating at least one of an activation command and a deactivation command to the application system that facilitates at least one of opening and closing a valve, activating and deactivating a pump, and opening and closing a chute.

9. The system of claim 5, wherein the rate controller deactivates the application system when the application vehicle is in the stop location.

10. The system of claim 1, wherein the application system includes at least one spray nozzle coupled to a boom.

11. A method for priming an application system to apply products onto a region of ground in conjunction with an application vehicle, the method comprising:
 determining a position of the application vehicle;
 referencing a map, wherein the map indicates an area of the region in which a product is to be applied;
 determining a start location, wherein the start location corresponds to a first point at a boundary of the area of the region in which the product is to begin to be applied;
 determining at least a speed and a direction of the application vehicle;
 determining a first latency characteristic associated with the application system, wherein the first latency characteristic comprises an amount of time delay associated with at least communication of an activation command;
 determining a first priming location based on the position of the application vehicle, speed of the application vehicle, direction of the application vehicle, the start location, and the first latency characteristic of the application system, the start location being separate and distinct from the first priming location; and
 priming the application system when the application vehicle is in the first priming location, such that the application system may begin to apply the product at the start location.

12. The method of claim 11, wherein determining the position of the application vehicle includes referencing global positioning system (GPS) data.

13. The method of claim 11, wherein the first latency characteristic includes at least one of an amount of time delay associated with building pressure, an amount of time delay associated with opening a valve, and an amount of time delay associated with opening a chute and the second latency characteristic associated with the application system further includes at least one of an amount of time delay associated with releasing pressure, an amount of time delay associated with closing a valve, and an amount of time delay associated with closing a chute.

14. The method of claim 11, wherein priming the application system comprises communicating at least one of an activation command and a deactivation command to the application system to facilitate at least one of opening and closing a valve, activating and deactivating a pump, and opening and closing a chute.

15. The method of claim 11, further comprising determining a second priming location based on the position, the speed, the direction of the application vehicle, a second latency characteristic associated with the application system, wherein the second latency characteristic comprises an amount of time delay associated with a communication of a deactivation command, and a stop location, the stop location being a second point at the boundary of the area of the region, in which product is not to be applied, the stop location being distinct from the first and second priming locations and deactivating the application system when the application vehicle is in the stop location.

* * * * *